United States Patent [19]
Khazai et al.

[11] Patent Number: 5,160,698
[45] Date of Patent: Nov. 3, 1992

[54] PROCESS FOR PRODUCING METAL BORIDES USING FINELY COMMINUTED MIXTURE OF REACTANTS

[75] Inventors: Bijan Khazai; William G. Moore, both of Midland, Mich.

[73] Assignee: The Dow Chemical Company, Midland, Mich.

[21] Appl. No.: 724,618

[22] Filed: Jul. 2, 1991

[51] Int. Cl.$^5$ .................. B22F 9/18; C22C 32/00
[52] U.S. Cl. .................. 419/12; 501/96; 423/297
[58] Field of Search .............. 501/96; 423/289, 297; 419/12

[56] References Cited

U.S. PATENT DOCUMENTS

| | | | |
|---|---|---|---|
| 2,613,154 | 10/1952 | Montgomery | 501/87 |
| 2,735,155 | 8/1951 | Glaser | 501/98 |
| 2,957,754 | 10/1960 | Nicholson | 423/297 |
| 3,052,538 | 10/1962 | Jech et al. | 419/12 |
| 3,096,149 | 7/1963 | Gruber | 23/301 |
| 3,244,482 | 4/1966 | Culbertson et al. | 423/297 |
| 3,249,401 | 5/1966 | Wood | 423/297 |
| 3,328,127 | 6/1967 | Byrns | 423/297 |
| 3,377,141 | 4/1968 | Hardy | 264/65 |
| 3,488,291 | 1/1970 | Hardy | 501/87 |
| 3,520,656 | 7/1970 | Meadows | 501/89 |
| 3,775,271 | 11/1973 | Brannan | 352/78 R |
| 4,056,602 | 11/1977 | Matovich | 423/349 |
| 4,266,977 | 5/1981 | Steiger | 501/96 |
| 4,301,020 | 11/1981 | Johnson, Jr. et al. | 501/1 |
| 5,047,372 | 9/1991 | Parrish et al. | 501/87 |
| 5,059,563 | 10/1991 | Khazai et al. | 423/289 |

FOREIGN PATENT DOCUMENTS 1273523 5/1972 United Kingdom .

OTHER PUBLICATIONS

Schwarzkopf et al, *Refractory Hard Metals*, pp. 277, 282, and 285, MacMillan Company, N.Y., 1953.
Ceramic Science Proc. 6 (9-10), 1313-20, 1985.

*Primary Examiner*—Mark L. Bell
*Assistant Examiner*—Deborah Jones

[57] ABSTRACT

A mixture of reactants having a particle size of about 200 microns is heated to convert said mixture comprising a metal compound, carbon, and a boron source to a metal boride having an average particle size of about 0.05 to about 0.5 micron. Said metal compound is one which can be converted to the corresponding metal boride by reaction with carbon and a boron source under controlled conditions of time and temperature.

8 Claims, No Drawings

PROCESS FOR PRODUCING METAL BORIDES USING FINELY COMMINUTED MIXTURE OF REACTANTS

BACKGROUND OF THE INVENTION

1. Field of the Invention

This invention relates to a process for producing metal borides of submicron size.

2. Description of the Prior Art

Finely-divided metal boride powders, particularly, titanium diboride, are desirable refractory materials of high hardness which are useful in electrical and thermal conductivity applications, as well as, in applications in which resistance to high abrasion and thermal shock are required. Titanium diboride is a particularly desirable refractory material because it is chemically inert to molten metals. In the prior art, it has been found that optimum properties of refractory materials, such as, titanium diboride, are not usually attained. This is because the consolidation of powdered materials required for the preparation of articles of titanium diboride and other metal boride refractory materials require extreme conditions of temperature and pressure as the result of the coarse particle size of the powder.

In addition, most prior art metal boride refractory material powders are adversely affected by the undesirable metal impurities which they contain because most of these powders are prepared utilizing time consuming comminution processes such as grinding using metal comminution devices. Accordingly, it would be desirable to produce metal boride refractory materials, particularly titanium diboride powders, having submicron size, which are free of contamination with undesirable metal impurities, in order to prepare improved quality refractory materials from these refractory metal boride powders.

It is known to prepare titanium diboride by the reaction of titanium dioxide, boric oxide, and carbon in accordance with the following equation:

$$TiO_2 + B_2O_3 + 5C = TiB_2 + 5CO$$

It is conventional to bring the reactants into contact at a high temperature, usually about 1800 to 2200 degrees centigrade, over long periods of time, usually about 1 to about 2 hours. It is also known in the refractory metal art that ceramic crystalline powders held at high temperatures for extended periods undergo substantial growth with the large crystals growing at the expense of the fine crystalline fraction. The result is that the submicron crystalline fraction is depleted and the large inactive micron and larger size crystals dominate. Much of the prior art teaches the use of extended reaction periods at high temperatures in order to produce boride powders in crucibles, kilns, pusher furnaces and the like, with the resultant production of large crystals which have low sintering activity. It is postulated that this low sintering activity is partly caused by the tendency of the particles to achieve the lowest possible energy state. This state is achieved by reducing the total particle surface area through coarsening of the particle crystal size by growth.

In U.S. Pat. No. 4,266,977, to Steiger, submicron containing titanium diboride powder and other hard, refractory metal boride powders, are prepared by vapor phase reaction of the corresponding metal halide, a vaporous carbon source, and a boron source. These titanium diboride powders are prepared in the presence of hydrogen in the reaction zone, the reaction being performed in the vapor phase.

In the prior art there is described the use of a variety of methods for preparing hard refractory metal borides such as titanium diboride. For example, elemental titanium and boron can be reacted at about 3630° F. This method produces products that are relatively impure and requires isolation of the boride product by chemical treatment. Other processes involve the reaction of elemental titanium with boron carbide (U.S. Pat. No. 2,613,154), the reaction of titanium hydride with elemental boron (U.S. Pat. No. 2,735,155), and the reaction of ferrotitanium and ferroboron alloys in a molten metal matrix, e.g., iron (U.S. Pat. No. 3,096,149). A fused salt bath containing an alkali metal or alkaline earth metal reducing agent and titanium and boron-containing reactants has been used to produce titanium diboride (U.S. Pat. No. 3,520,656). In U.S. Pat. No. 3,775,271, there is described the electrolytic preparation of titanium and zirconium diborides by using a molten sodium salt electrolyte and rutile or zircon concentrates as the source of titanium and zirconium, respectively.

The preparation of the borides of titanium, zirconium, and hafnium by the vapor phase reaction of the corresponding metal halide, e.g., titanium tetrachloride, and a boron halide, e.g., boron tichloride or boron tribromide, in the presence of hydrogen at temperatures of from 1000°–1330° C., to 1700°–2500° C., respectively, has been reported. See *Refractory Hard Metals*, by Schwarzkopf and Kieffer, the MacMillan Company, N.Y., 1953, pages 277, 281 and 285. Typically, these vapor phase reactions have been conducted by heating the reactants in the presence of an incandescent tungsten filament. Such procedures, however, produce a coating of the metal boride on a heated substrate rather than a powdery product. The aforementioned vapor phase reaction for preparing titanium diboride has been conducted at temperatures less than 1200° C., using sodium vapor in lieu of hydrogen (U.S. Pat. No. 3,244,482).

A widely reported commercial process used for preparing refractory metal borides, e.g., titanium diboride, is the carbothermic process. This process is described in U.S. Pat. No. 2,957,754 and U.S. Pat. No. 3,328,127. A more recent description of the carbothermic process is found in *Ceramic Engineering Science Proceedings*, 6 (9–10) 1313 (1985) by Kim et al. In this process, refractory metal oxide, e.g., titanium dioxide, an oxide of boron, e.g., $B_2O_3$, and carbon are heated in an electric arc or induction furnace. As an alternative to the electric arc furnace, it has been proposed to prepare titanium diboride by injecting powdered activated charcoal impregnated with boron oxide and titania (anatase) into an argon plasma (British Pat. Specification No. 1,273,523). In this process, about one gram of product is produced in ten minutes and it is not, therefore, considered commercially attractive. The product obtained from the aforementioned carbothermic process is comminuted by grinding in, for example, jaw-crushers and mills, and, thereafter, screened to obtain a finely divided product. Extensive milling is required. For example, in U.S. Pat. No. 3,052,538, there is described the milling of intermetallic compounds such as titanium diboride and titanium carbide to obtain a fine particle size useful for dispersion strengthening of titanium. A milling time of 300 hours (12½ days) in a porcelain mill using hardened steel balls as the grinding medium is required.

The reported average size of the product produced from such lengthy milling ranges from about 2.5 microns. Moreover, the product is contaminated with impurities abraded from the materials of construction of the mill and grinding surface. Thus, it is common to find metallic impurities in the product such as tungsten, iron, chromium, cobalt, and nickel.

In U.S. Pat. No. 3,249,401, to Wood et al., the production of titanium diboride is disclosed as proceeding in accordance with the above equation utilizing a reaction mixture slug of a special shape which is designed to give more efficient heat transfer from the furnace to the slug in order to produce titanium diboride at a greater rate at any particular temperature chosen. The slugs can be lengths of a reaction mixture of tubular section, channel section, cruciform section, star section or semi-circular section, with or without a corrugated surface.

In U.S. Pat. No. 3,488,291 to Hardy et al., metal carbide/free metal compositions are disclosed which are useful in powder metalurgy applications. These compositions have average particle diameters below about 1.0 micron and often below 0.5 micron. They are produced by a process in which the reactants are spray dried from a mixture of the reactants. The spray dried mixture of reactants is converted to metal carbides at a temperature of about 400°–500° C. or higher.

In U.S. Pat. No. 3,377,141 to Hardy et al., a process is disclosed for producing metal carbide powders having submicron particle size by the reaction of a spray dried mixture of a metal compound and carbon at a temperature of about 400°–500° C. or higher. While the particle size of the spray dried reaction mixture is stated as about 20–60 microns, there is no indication as to the particle size of the finally produced metal carbide.

SUMMARY OF THE INVENTION

There is disclosed a novel method of preparing metal borides, particularly titanium diboride, utilizing particles composed of a mixture of finely comminuted reactants, for instance, produced by spray drying a slurry of a metal compound, carbon and a boron source, which are heated under an inert atmosphere at an elevated suitable temperature for a suitable time to convert the metal compound to the corresponding metal boride. A temperature of about 1200° C. to about 2500° C. is generally desirable during a time of about 1 to about 5 seconds.

The preferred process of the invention avoids the contamination of metal boride powders produced during processes for comminution of larger particle size metal borides. Prior art metal boride powders must, generally, be ground to a finer particle size prior to consolidation by sintering at elevated temperatures to produce shaped metal boride articles.

The process of the invention results, unexpectedly, in the production of submicron particle size metal borides. The particle size of the metal boride powders produced by the process of the invention is predominantly under 1 micron, generally, about 0.05 to about 0.5 micron, preferably, about 0.1 to about 0.3 micron, and, most preferably, about 0.1 to about 0.2 micron.

DETAILED DESCRIPTION OF THE INVENTION

The metal borides of the invention are produced, generally, by reacting a metal compound with a carbon source and a boron source. The metal compounds which can be used generally comprise any organic, inorganic or complex salts, for instance, metal salts of organic acids such as, metal oxides, nitrates, acetates, citrates, oxylates, formates, benzoates, carbonates, oleates, and tartrates. The metals useful in the formation of said metal compounds are those metals which are capable of reaction with a carbon source and a boron source to produce metal borides. Typical metal compounds are formed from metals, such as, chromium, tungsten, thorium, aluminum, titanium, silicon, zirconium, tantalum, hafnium, uranium, vanadium, niobium, molybdenum, and mixtures thereof.

An important part of the process of the invention is the rapid reaction of a mixture of reactants at elevated temperature. In a preferred process of the invention, a starting mixture of reactants, or feed stock mixture, either has or is processed to have an individual average particle size, generally, of less than about 20 microns, preferably about 1 to about 10 microns and, most preferably about 1 to about 5 microns. The starting mixture of reactants, if composed of particles outside these ranges, can be finely comminuted, for instance by subjecting the mixture of reactants to mechanical forces, opposing high velocity, inert gas streams, or other means of comminution. Subsequently, these finely comminuted starting materials are agglomerated by any convenient means, for instance, drum drying, freeze drying, or spray drying a mixture of the starting material reaction mixture dispersed in a liquid medium, preferably, so as to obtain a slurry. The agglomerated particles so obtained, generally, have an agglomerate average particle size of up to about 200 microns, preferably, about 10 to about 150 microns and, most preferably, about 20 to about 100 microns.

Generally, any liquid medium can be used in the preparation of the slurry of reactants, providing the liquid medium is inert with respect to reaction with the metal compound, carbon black and boron source. Representative liquid media are light hydrocarbons such as heptane, hexane, decane, carbon tetrachloride, and isopentane and ketones such as acetone, methyl ethyl ketone and the like. Water can be used as the liquid medium of the slurry. If water is used as the medium, then other means of agglomeration can be employed such as, suspension in an emulsion polymerization medium, and polymerization followed by freeze or vacuum drying.

The boron source can be boron oxide, boric acid, boron carbide, or boron rich boron carbide. The carbon source useful in the present invention may be any carbon-containing material which upon heating will form carbon. Preferably, the carbon source used in the present invention is an acetylene black of high purity with a low content of heavy metals. The undesirable heavy metals include, for example, iron (Fe), chromium (Cr), and nickel (Ni). Preferably, the purity of the carbon used in the present invention should be such that the final product contains less than 500 ppm of Fe, and preferably, less than about 200 ppm of Fe.

Useful carbon sources are those produced from the thermal decomposition of hydrocarbons to yield carbon particles having a particle size, generally, of about 4 microns and specific surface area values ranging from about 7 square meters per gram ($m^2/g$) to about 2000 $m^2/g$. Reactive carbons of high purity can also be made from cornstarch by controlled decomposition or be made by the thermal decomposition of a predominantly vinylidene chloride polymer and have a surface area of about 700 m$^2$/g or about 1400 m$^2$/g, respectively.

The carbon utilized as a reactant in the process of the invention is, generally, a carbon black produced by the incomplete combustion and/or pyrolysis of hydrocarbon materials. For example, carbon materials referred to in the art as acetylene blacks, lamp blacks, furnace blacks, thermal blacks, channel blacks, etc., are all included within the scope of the carbon reactant utilized in the process of the present invention.

The preferred carbon is an acetylene carbon black sold by The Chevron Corporation, or a carbon black derived from the thermal decomposition of methane which is sold under the trade name Cancarb 980 by the International Minerals Company. This carbon has a particle size of about 0.4 microns.

The manner of mixing the carbon black with the metal compounds and boron source, for instance, boric oxide in dispersion form prior to spray drying contributes significantly to the advantages of the process of the invention. Thus, it is particularly important to utilize small particle size reactants in a liquid medium in the presence of a dispersant. In U.S. Pat. No. 4,301,020, incorporated herein by reference, particularly useful dispersants are disclosed for use in producing a spray dried ceramic or to produce a ball milled slurry of a ceramic. A dispersant sold under the trade name TRITON X-100 by the Rohm & Haas Company has proven particularly useful.

The ease of removal of a liquid medium from the feedstock mixture by spray drying contributes materially to the ease and uniformity by which the spray dried reactant mixture is subsequently converted to the metal boride product. A slurry having a solids content, generally, of about 5% to about 50%, preferably, about 10% to about 30% by weight is used. The slurry, if aqueous based, may be heated prior to spray drying to a temperature of about 20° C. to about 90° C.

It is pointed out that spray drying is quite different from conventional drying processes. For example, conventional drying of a mixture would normally proceed by way of evaporation of the solvent from the surface of a presscake and the continuous replacement of this surface solvent by capillary migration of moisture from the interior portions of said cake. Such uneven drying normally gives rise to agglomerates which are non-uniform in both size and composition. In spray drying, however, evaporation takes place from uniform droplets surrounded by warm gases. Under such conditions, the resulting dry particles are normally relatively uniform in size and, of equal or even greater importance, have a uniform composition. In existing commercial spray drying equipment, the powdered product obtained by spray drying is normally characterized by relatively spherical particles which are usually of a hollow or porous nature. Generally, the spray dried particles have an average particle size of about 5 to about 250 microns.

A more complete description of the details of commercial spray drying systems can be found in "Design and Use of Spray Dryers", pages 83–88 of *Chemical Engineering*, Sep. 30, 1963. It is to be understood, however, that the practice of our invention is not restricted solely to the processes and apparatus set forth in the aforesaid article. Instead, by use of the term "spray drying", it is intended to include within the scope of the present invention those drying processes wherein a mixture is subdivided into and maintained as discrete, preferably, uniform droplets while conducted through a zone heated to a temperature sufficient to dry same. Especially included are those drying processes in which the average particle size of the dried solid product is no greater than about 200 microns. Generally, the spray drying is conducted at a temperature of about 120° C. to about 350° C.

When the boron source is boric acid, further heating to dehydrate the boric acid to boric oxide prior to the reaction can be advantageous. Otherwise, the evolution of water in the reaction will cause reaction with the precursor carbon source present to give carbon dioxide and hydrogen. An adjustment in the carbon stoichiometry will, therefore, be necessary.

The agglomerated reactant mixture is, preferably, introduced to a tubular type heating zone under an inert atmosphere in the final heating step of the process of the invention using a feeder system that produces as uniform a flow of the mixture as possible. Various applicable feeders, such as twin screw feeders, star valves, slow speed screw feeders, venturi feeders, and the like, as well as modifications thereof, will be known to the skilled artisan. The feeder is desirably a twin screw feeder.

Subsequent to feeding the particulate reactive mixture to the heating zone, the particles of the reactive mixture are preferably entrained and further dispersed in a gas, which can be either an inert gas, such as argon or another inert gas. For example, argon, helium, nitrogen or hydrogen can preferably be used, with argon being more preferred. Hydrogen may be particularly compatible since residual water in the reactive mixture will react with the carbon to produce carbon monoxide and hydrogen.

Even when an entrainment gas (inert or reaction-compatible gas) is used to entrain and disperse the agglomerated reactant powder containing a metal compound, boric oxide, and carbon prior to entry into the heated portion of the tubular type reactor reaction zone, counter-flowing thermal eddy currents within the reactor inevitably force a substantial quantity of fine reactant powder against cooler inlet surfaces. This results in reactor plugging due to the formation of larger agglomerates containing boric oxide. These larger agglomerates may then fall or be swept through the reaction zone to yield product agglomerates having incompletely converted inner cores of reactant. This problem is partially solved by the use of a "fluid wall" tubular reactor.

A problem encountered with the use of a "fluid wall" reactor as disclosed in the prior art, is that of limited residence time within the reaction zone. A significant quantity of fluid is necessary to generate the annular envelope of gas which protects the reactor wall. The residence time of the reactant powder transported through the reactor is highly dependent on the flow rate of gas within the reactor tube. Hence it is expected that in carrying out a reaction between a metal compound, boric oxide, and carbon to synthesize metal borides, it will be necessary to minimize the flow of unnecessary inert fluids in order to maximize reactor capacity. This is especially true if the inert fluid is expensive, such as are argon or helium.

Another problem with using the known tubular type reactor configurations is that of preventing the condensation of excess vaporized reactant (e.g., boric oxide) along the inside walls of the cooling zone in those designs having such a specified area. Excess boric oxide is typically employed in the reactant mixture because any unreacted boric oxide is soluble in water and can usually be easily washed from the product powder. When the reactor designs described above are used with excess boric oxide-containing feeds, the exiting product contains vaporized boric oxide which goes through a cooling cycle from above 1400° C. to below 325° C. as it passes within the cooling zone, and, thus, inevitably is in the liquid stage at a certain place near the inlet of the reactor cooling zone. This means that liquid boric oxide will tend to deposit and solidify within the inlet of the cooling zone, again often causing reactor plugging problems and preventing continuous operation.

Generally, the preferred spray dried or otherwise prepared particles described above are reacted in the heating zone of the process of the invention at a temperature of about 1200° C. to about 2500° C., preferably, about 1500° C. to about 2200° C., and, most preferably, about 1600° C. to about 2000° C. The use of shorter residence times in the reaction zone, results in many economic advantages in both the design of the apparatus and the ease of operation. But, more importantly, shorter reaction times minimize the undersirable possibility of sintering the metal boride product produced in the process. This has long been a serious problem in converting metal compounds to fine particle size products. Accordingly, the process of the invention is a highly versatile, especially simple, and economical process for producing diverse metal borides and mixtures thereof in a submicron particle size form, thus, eliminating elaborate and expensive attrition techniques required heretofore in the production of metal borides.

The heating method of the present invention is an important feature of the invention. Each of the individual particles of the agglomerated reactive mixture of metal source, boron source, and carbon source, from the outer surface of the particle to its innermost portion must be individually and separately brought up to the reaction temperature in a short period of time, i.e. in a matter of seconds, in order to produce submicron size metal borides. The agglomerated mixture of metal source, boron source, and carbon source is, preferably, rapidly heated to a reaction temperature which is hundreds of degrees centigrade higher than the initiation temperature for the reaction of approximately 1200° C. The agglomerated mixture is maintained at the reaction temperature for a sufficient length of time to substantially complete the reaction to form submicron metal borides. In addition, the particle size of the individual particles of the feed material must be small enough to allow the individual particle interior to attain the reaction temperature at the rapid heating rate necessary for producing submicron crystals. Generally, the particle size is less than about 20 microns, preferably, about 1 to about 10 microns, and most preferably, about 1 to about 5 microns.

Alternatively, the boron source, carbon source, and metal compound mixture feed material may, less desirably, be ground to less than about 200 micron particle size and fed continuously into a tubular reactor, as described above, or fed into a crucible heated to 1700° C. at a rate which allows the individual particles to be heated to the surrounding temperature in several seconds. In this manner, no large crystals are formed and the product is entirely submicron size metal boride. For production of uniform, narrow particle size metal boride, a steady feed rate of well dispersed feed particles in a hot reaction zone is necessary.

Alternatively, the tubular type heating apparatus preferred for use as a reaction zone in the present invention may be any type of heater known in the art for heating particles to the reaction temperature and at the heating rates in accordance with the invention. For example, a tubular-type reactor such as disclosed in U.S. Pat. No. 4,056,602, incorporated herein by reference, may be used in the present invention. In this tubular type reactor, the material is fed into the reactor, for example, using a screw feeder and the like and allowed to fall to the hot zone of the reactor by gravity and pass through the hot zone to a collection point. The particles are heated at a rapid rate and form metal boride particles substantially immediately upon contacting the hot zone.

For vertical, tubular flow through reactors, the feed size and particle dispersion is somewhat more critical because of the limited time available for heating the falling particles. It has been found that large, i.e. 1-2 mm, feed particles will not be uniformly heated to a reaction temperature of 2000° C. in the time it takes to fall through a 6 inch diameter by 6 feet high vertical tubular reactor. Smaller particles having a size of about 200 microns will be heated non-uniformly and partially react while particles having a size of less than about 50 microns will be heated and completely reacted in less than about two seconds. The particle size and feed rate must be matched to the heat transfer limitations of the reactor system to allow each particle to be heated to the desired reaction temperature in several seconds.

Those familiar with the art will recognize that fine particle size powders such as those having a particle size of about 20 to about 30 microns comprising an intimate mixture of a metal compound, boron source, and carbon source tend to agglomerate to much larger sized aggregates which are unsuitable for use because, to obtain thorough heating of each particle, the rapid heating rate necessary cannot be achieved. For example, a helical screw feeder will discharge agglomerates at an intermittent rate coincident with the rotation rate of the screw. It is, therefore, necessary to provide for the dispersion of these agglomerates in a carrier gas before they enter the heating zone as an aid in obtaining the uniform high heating rate essential for a narrow particle size distribution of the submicron metal boride crystal product.

The dispersed feed particles can re-agglomerate after entering the heating zone of the reactor if temperature zones are encountered by the particles which are above the melting point of the boron oxide (approximately 300° C. to 500° C.) but below the 1200° C. to 1300° C. reaction initiation temperature.

A preferred embodiment of the present invention is the preparation of an intimate mixture of a metal compound, boron source, and a carbon source as a reactive mix having a particle size which can be rapidly heated to the reaction temperature in a matter of seconds; metering said feed mix at a uniform rate to a flowing, inert gas stream where de-agglomeration by mechanical or pneumatic means occurs such that the particles are further dispersed; flowing the dispersed feed particles through a cooled pipe maintained below the melting point of the boron oxide phase; and then passing the feed particles into a reaction zone substantially above the incipient reaction temperature of the metal compound, if using boron oxide as the boron source, and carbon as the carbon source, in order to heat the particles to the reaction temperature at a rate which allows the production of submicron size metal boride crystals.

Deviations from the stoichiometric requirements for the boron source so as to yield a boron deficient feed, can result in the formation of metal carbide-boride composites.

The proportion of carbon source and boron source to be combined with the metal compounds will be determined primarily by the amount of carbon desired in the final composition. It is considered that the process of the invention is most valuable when applied to the production of finely-divided metal boride compositions of high purity, that is, metal boride compositions containing very small quantities of carbon source, i.e., carbon black or metal impurities. Accordingly, in the most preferred embodiment of the process of our invention, the amount of carbon black utilized will rarely exceed the amount required to produce compositions comprising more than about 1% by weight carbon black as an impurity.

The process of the invention can also be applied to the production of finely-divided metal boride compositions having large amounts of carbon black. Such compositions can be used as fillers in elastomeric compositions and, accordingly, can contain up to about 90% by weight of carbon black, if desired. If it is desired to produce metal borides which are essentially free of carbon, this can be easily accomplished by mixing the metal compound reactant with an amount of carbon black which is approximately equivalent to the stoichiometric amount required to convert the metal compound in the presence of a boron source such as boric oxide.

The temperature at which the finely comminuted metal compound, carbon source, and boron source particles can be converted to the corresponding boride can vary over a wide range. Preferably, the conversion temperature used is about 1500° C. to about 2200° C. The lower temperature is of special utility when the conversion is to be achieved by way of a batch type process. However, a more efficient method of converting the metal compound to the corresponding metal boride is by way of a continuous process in which the spray dried or similar particle size reactants are continuously conveyed to a reaction zone maintained at a high temperature. In such continuous processes, it is obviously desirable to reduce the residence time to a minimum and, thus, the process of invention is particularly advantageous in that the reaction times can be minimized in order to inhibit excessive crystal growth.

The following examples illustrate the various aspects of the invention but are not intended to limit its scope. Where not otherwise specified throughout this specification and claims, temperatures are given in degrees centigrade and parts, percentages, and proportions, are by weight.

EXAMPLE 1

This example illustrates the preparation of a slurry of titanium dioxide, boric acid, and carbon black in an aqueous medium.

Titanium dioxide in the amount of 160 grams, boric acid in the amount of 321 grams, and carbon black in the amount of 120 grams, were charged into water in the amount of 7 liters. The carbon source used was an acetylene carbon black having a particle size of about 0.4 micron sold by the Gulf Oil Corporation. The titanium dioxide used had a particle size of about 2 microns and was sold by Alta Chemical Company. The boric acid had a particle size of about 200 microns and was sold by U.S. Borax Company. In the preparation of the slurry, a dispersant was used in the amount of 70 milliliters. The dispersant used was octyl phenoxypolyethoxyethanol sold under the trade name TRITON X-100 by the Rohm and Haas Company. In the preparation of the slurry, the materials were combined and mixed under the following conditions.

The carbon was added to the water containing the TRITON X-100 under agitation utilizing a stainless steel impeller in a glass tank at a temperature of 70° C. Boric acid was then added to the mixture together with the titanium dioxide. The slurry was spray dried utilizing a spray drying apparatus which was operated by feeding the slurry solution to the dryer at an inlet temperature of 290° C. and an outlet temperature of 104° C. The spray dryer used was a Bowen Engineering Company spray dryer having a cylindrical diameter of 2½ feet and equipped with a rotary atomizer.

Approximately 100 grams of the spray dried reactant powder was obtained. This was dried at a temperature of 350° C. over a period of about 2 hours prior to conversion to titanium diboride as further described in Example 2. The spray dried powder had an average particle size of about 25 microns.

EXAMPLE 2

A graphite crucible was placed in a heated zone of a reactor which was evacuated and subsequently kept under a continuous purge of argon gas. The graphite crucible was heated to a temperature of about 1970° C. and, thereafter, about 1 gram of the spray dried feed material prepared in Example 1 was dropped into the hot crucible and allowed to remain at 1970° C. for a period of 1 to 1½ minutes. Thereafter, the power to the furnace providing heat to the reaction zone was turned off and the sample in the crucible was allowed to cool under a continuous flow of argon gas. Examination of the reaction product by X-ray diffractometry, indicated the formation of titanium diboride. Subsequent examination of the powder by scanning electron microscopy and transmission electron microscopy, indicated well formed particles having an average particle size of about 0.1 micron.

While this invention has been described with reference to certain specific embodiments, it will be recognized by those skilled in the art that many variations are possible without departing from the scope and spirit of the invention. It will be understood that it is intended to cover all changes and modifications of the invention disclosed herein, for the purposes of illustration, which do not constitute departures from the spirit and scope of the invention.

The embodiments of the invention in which an exclusive property or privilege is claimed are defined as follows:

1. A process for producing a finely divided metal boride comprising the steps of:
   (A) preparing a mixture of reactants having an average agglomerated particle size of up to about 200 microns composed of individual particles having a particle size of less than 20 microns, comprising a carbon source reactant, a boron source reactant, and a metal compound reactant, which can be converted to the corresponding metal boride by reaction at elevated temperature,
   (B) reacting said particles in a heating zone under an inert atmosphere at a suitable temperature and for a suitable time to convert the metal compound to the corresponding metal boride wherein the average particle size of said metal boride is about 0.05 to about 0.5 micron.

2. The process of claim 1 wherein said metal compound is selected from the group consisting of the compounds of tungsten, molybdenum, chromium, vanadium, thorium, aluminum, titanium, silicon, zirconium, tantalum, hafnium, uranium, niobium, and mixtures thereof.

3. The process of claim 2 wherein said individual particles are obtained, by exposure of the mixture of reactants to at least one of
   (A) mechanical forces or
   (B) opposing, high velocity, inert gas streams and wherein said agglomerated mixture of particles is obtained by dispersing said mixture of reactants in a liquid medium to produce a slurry and spray drying said slurry.

4. the process of claim 3 wherein said metal compound reactant is a titanium compound, said metal boride is titanium diboride, and said agglomerated mixture of particles is heated under an inert atmosphere at a temperature of about 1200° C. to about 2500° C. for a time of less than about 5 minutes.

5. The process of claim 4 wherein said titanium compound reactant is titanium dioxide.

6. The process of claim 5 wherein said boron source reactant is boric oxide or boric acid and said carbon source reactant is an acetylene black.

7. The process of claim 6 wherein said slurry is prepared at a solids content of about 5 to about 50% by weight and heated to a temperature to about 20° C. to about 90° C. prior to drying in a spray drying process to produce spray dried particles.

8. The process of claim 7 wherein said agglomerated mixture of particles has an average particle size of about 10 to about 150 microns.

* * * * *